United States Patent [19]

Falcoz et al.

[11] 4,080,217

[45] Mar. 21, 1978

[54] ALUMINO-CALCIUM COMPOUNDS AND THEIR UTILITY IN HYDRAULIC BINDERS

[75] Inventors: Pierre Falcoz, Champagne au Mont d'Or; Philippe Borrel, Grenoble, both of France

[73] Assignee: Rhone-Poulenc Industries, Paris, France

[21] Appl. No.: 665,322

[22] Filed: Mar. 9, 1976

[30] Foreign Application Priority Data

Mar. 11, 1975  France .................... 75 08168

[51] Int. Cl.$^2$ ............................... C04B 7/02
[52] U.S. Cl. ........................ 106/90; 106/314
[58] Field of Search .................. 106/90, 104, 314

[56] References Cited

U.S. PATENT DOCUMENTS

| | | | |
|---|---|---|---|
| 1,972,208 | 9/1934 | Tucker | 106/90 |
| 2,588,248 | 3/1952 | Klein | 106/90 |
| 3,502,490 | 3/1970 | Ware | 106/90 |
| 3,662,830 | 5/1972 | Martin | 106/90 |
| 3,677,780 | 7/1972 | Nishi et al. | 106/90 |
| 3,885,985 | 5/1975 | Serafin et al. | 106/90 |

*Primary Examiner*—Patrick P. Garvin
*Assistant Examiner*—John P. Sheehan
*Attorney, Agent, or Firm*—Bacon & Thomas

[57] ABSTRACT

Certain alumino-calcium compounds are added to hydraulic binders, as water reducing agents for enhancing the workability of such binders while at the same time reducing the requisite quantities of water needed therefor.

8 Claims, No Drawings

ALUMINO-CALCIUM COMPOUNDS AND THEIR UTILITY IN HYDRAULIC BINDERS

BACKGROUND OF THE INVENTION

1. Field of the Invention

The present invention relates to certain alumino-calcium compounds, their utility as components in hydraulic binders, and processes for the preparation and formulation thereof.

2. Description of the Prior Art

Water-reducing agents have to date been incorporated into hydraulic binders in order to bring the binder to an easily workable fluid form while minimizing the quantity of water required for mixing. The most common water-reducing agents employed to these ends include the water-soluble aryl- or alkylaryl sulfonate salts, which optionally have been condensed with formaldehyde. While these agents have provided a measure of utility insofar as they have achieved a certain enhancement in the workability of hydraulic binders incorporated therein, these water soluble products suffer certain significant disadvantages. Notably, when the known water-reducing agents are incorporated at a high dose, there is a pronounced tendency to introduce air into the mixture which results in a substantial diminution in mechanical strength of the ultimate structural component or constructional unit. Significantly, also, these known water-reducing agents do not permit the maintenance of fluidity of the binder over the period between mixing and setting thereof.

Accordingly, the need exists to provide a new and improved class of water-reducing agents which is capable of increased water-reducing characteristics at low doses, is effective for extended periods of time after mixing, and does not permit of the objectionable introduction of air to the system if employed at higher doses.

SUMMARY OF THE INVENTION

It is, therefore, the major object of the present invention to provide an improved class of alumino-calcium water-reducing agents for use in hydraulic binders.

It is also an object of the present invention to provide improved water-insoluble, water-reducing agents which may be added to hydraulic binders at lower doses than heretofore practicable.

It is a further object of the present invention to provide improved water-insoluble, water-reducing agents for incorporation with a hydraulic binder, which admixtures are effective for longer periods of time after mixing.

It is still a further object of the present invention to provide improved water-insoluble, water-reducing agents which may be incorporated with a hydraulic binder at higher doses than heretofore attainable without the comcomitant increased introduction of air into the mixture.

Yet a further object of the present invention is to provide a process for the preparation of a new class of water-insoluble, water-reducing agents for incorporation into a hydraulic binder.

Yet another object of the invention is the provision of improved constructional units comprised of a hydraulic binder and the subject alumino-calcium water-reducing agents.

In accordance with the foregoing objects and advantages of the present invention, it has now been determined that an improved water-insoluble, water-reducing agent of the general formula $(x\ CaO.y\ Al_2O_3.z\ R.nH_2O)_m$, in which $x = 2$ to 3, $y = 0.5$ to 1.5, $z = 0.5$ to 3.5, $n = 0$ to 50, $m = 1$ to 50, and R is a calcium aryl- or alkylaryl-sulfonate salt, which optionally may be condensed with formaldehyde, is desirably added to hydraulic binders to improve the properties thereof, such additions typically being on the range of from about 0.1 to about 10% by weight based upon the total weight of the binder. Where the calcium aryl- or alkylaryl-sulfonates salt consists of a polymeric molecule, R then represents the equivalent of the polymeric molecule which contains one divalent calcium ion.

Yet other objects and advantages of the present invention will become apparent to those skilled artisan upon examination of the following detailed description of the invention.

DETAILED DESCRIPTION OF THE INVENTION

The present invention relates broadly to improved alumino-calcium compounds and their utility in hydraulic binders, for increasing the workability thereof while reducing the amount of water-required therefor. This new class of compounds, the compounds themselves being solid and water-insoluble, is represented by the general formula $(x\ CaO.y\ Al_2O_3.z\ R.nH_2O)_m$, and may be prepared in various ways:

1. By the action of a solution of an aluminum aryl- or alkylaryl-sulfonate salt on a milk of lime It has been determined that this method of preparation provides the most effective results when the proportion of 4 to 7 mols of milk of lime per 0.5 to 1.5 mols of the aluminum salt are used. In such a case, if the solution of the aluminum salt is rapidly added to the milk of lime, the temperature being between ambient and the boiling point of the mixture, the reaction is substantially instantaneous. The solutions may be very dilute or can approach a concentration of as high as 50% by weight; albeit, at the high concentrations, the precipitate obtained renders the solution highly viscous and, thus, difficult to stir. Accordingly, it is more convenient to work with solutions on the order of 20 to 25% by weight. The product obtained is relatively stable suspension which may be used without further treatment. Optionally, the suspension may be filtered and/or dried for storage.

2. By the action of a solution of a calcium aryl- or alkylaryl-sulfonate (R) on anhydrous tricalcium aluminate When employing this method of preparation of the improved agents of the present invention, it has been determined that a proportion of 0.5 to 1.5 mols of tricalcium aluminate per 2.5 to 3.5 mols of calcium salt is preferred. The tricalcium aluminate, having been ground to a powder, is added to a stirred solution of the calcium salt, the temperature of reaction being within the range of from ambient to the boiling point of the mixture. The reaction according to this method is relatively slow and typically requires about 24 hours for all of the calcium salt to react. Preferred sources of tricalcium aluminate include artificial Portland cement rich in aluminate or, more preferably, a ground gypsum-free clinker of this cement.

3. By the action of monocalcium aluminate on a solution of lime and a calcium aryl- or alkylaryl-sulfonate (R)

When employing this method to produce the new and improved agents of the present invention, it is preferred to employ 0.5 to 1.5 mols of monocalcium aluminate per 1 to 2 mols of lime and 2.5 to 3.5 mols of calcium salt. The monocalcium aluminate is added, as a powder, to a solution of the calcium salt containing the lime constituent in suspension. As with (2) above, the reaction is relatively slow and may require several days for the components to completely react. A preferred source of the monocalcium aluminate is common alumina cement.

The calcium aryl- or alkylaryl-sulfonate salts employed in conjunction with the present invention are the salts of the sulfonation products of fused polycyclic-hydrocarbons having 2 to 12 fused benzene rings. The anionic portion of these salts may be represented by the general formula $(SO_3)^-_{1\text{ or }2}$—Ar—R', where R' represents an alkyl group or hydrogen and where Ar represents a fused polycyclic radical containing 2 to 12 fused benzene rings.

These calcium aryl- or alkylaryl-sulfonate salts may be the polymeric products obtained by condensing formaldehyde with compounds resulting from the sulfonation of monocyclic or polycyclic fused hydrocarbons containing 1 to 12 benzene rings, and having a mean molecular weight of from about 1,500 to about 10,000. The anionic portion of these molecules may be represented by the general formula:

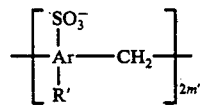

where Ar represents a benzene ring or a fused polycyclic radical containing 2 to 12 benzene rings, R' represents an alkyl group or hydrogen, and m' is chosen to provide a mean molecular weight of from about 1,500 to about 10,000. When employing such a polycondensed molecule, R in the general formula for the products according to the invention $(x\text{ CaO}.y\text{ Al}_2\text{O}_3.z\text{ R}.n\text{H}_2\text{O})_m$ then corresponds to the group which contains one divalent calcium ion ($Ca^{++}$), i.e., having an anion:

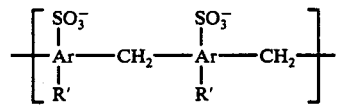

Among the condensed calcium aryl- or alkylaryl-sulfonates generally set forth above, the calcium polymethylenenaphthalene-sulfonate salt is preferred. The aluminum salt of this product may be prepared in the following manner: 64 parts of naphthalene are heated to 160° C. and 75 parts of 98–100% strength sulfuric acid are then added; the mixture is maintained for 2 hours at 160° C. under constant stirring and is then cooled to 100° C. at which time 20 parts of water are added; thereafter, having maintained the mixture at 100° C. for 4 hours, 40 parts of 37% strength formaldehyde and 80 parts of water are added. The solution thus obtained is subsequently added to a milk of lime containing 37 parts of lime and 56 parts of water, to which is then added 166 parts of crystalline aluminum sulfate dissolved in 300 parts of water. Calcium sulfate is filtered off and a 20% strength solution of aluminum polymethylenenaphthalenesulfonate is obtained. This aluminum salt is then utilized in the preparation of the products according to the invention by process (1) described above.

It is also possible to prepare an aluminum salt, which is less pure but is nonetheless suitable for the invention, in the following manner: 64 parts of naphthalene and 75 parts of 98–100% strength sulfuric acid are heated together for 2 hours at 160° C.; the mixture is cooled to 100° C. and 20 parts of water are added; 40 parts of 37% strength formaldehyde are then added and the mixture is maintained at 100° C. for 4 hours at which time 80 parts of water are added. A solution of sodium aluminate containing 20.5 parts of sodium aluminate and 56 parts of water is then added. The solution thus obtained, though it contains sodium sulfate in solution, can then be used to prepare the products according to the invention by process (1) described above.

The products of the general formula $(x\text{ CaO}.y\text{ Al}_2\text{O}_3.z\text{ R}.n\text{H}_2\text{O})_m$ which are obtained in accordance with any of the three processes described above are in the form of suspensions which consist of very fine particles which settle out very slowly and are easily resuspended. The pH of these suspensions is between 10 and 11 and varies little, even if the amount of lime used for the preparation of the suspensions is altered. These products can be employed as obtained, in the form of a suspension, in the binders, or can be employed in the binders in a solid form obtained by spray drying of the suspension or by filtering and drying. Drying can be effected at a temperature between about 10° and about 150° C., by means of dry air. Depending on the drying temperature, the product obtained will be more or less hydrated, where n will vary between 0 and 50. If the suspension is dried in bulk at 150° C., the product can be broken into fragments of approximately square shape which will subsequently disintegrate on contact with moist air. These products dried at 150° C. exhibit calcium and aluminum contents which are respectively between 11 and 20%, and between 1.4 and 16%; thus corresponding to $x = 2$ to 3, $y = 0.5$ to 1.5 and $z = 0.5$ to 3.5 in the general formula. Preferably, according to the invention, products are employed which correspond to a calcium content of between 12 and 15% and an aluminum content between 2 and 4%. In contact with water, the products according to the invention, though insoluble in both water and oils, undergo a slight decomposition which causes a part of the organic sulfonate, in the form of a calcium salt, to pass into solution, the equilibrium being reached at a salt concentration between 1 and 30 g/l and generally of about 5 g/l. By prolonged percolation it is possible to extract practically all the product R and the lime, the residue being an alumina gel. Since the heat stability of the products according to the invention corresponds to that of R, their thermal decomposition in general occurs from 200° C. onwards.

The products according to the invention are introduced into the binders at the rate of from about 0.1 to about 10% by weight relative to the binder; preferably, other than for exceptional uses, the proportion is generally kept to below 5% and, most preferably, the products according to the invention are used at the rate of 0.1 to 2% by weight relative to the binder.

It has been determined that the duration of effectiveness of the products of the invention is much greater than that of the prior art. This effectiveness enables the binder to exhibit fluidity for a relatively long time, even though the amount of mixing water employed may be significantly reduced (i.e., the weight ratio (mixing water/cement) = $(W/C)$ is low. Thus, a finished product possessing superior mechanical properties is obtained.

Because of the superior properties of the alumino-calcium products of the present invention they may be added to hydraulic binders at much lower effective doses than necessary with conventional water-reducing agents. For example, the rate of 0.1% to 0.3% by weight of dry product relative to the binder gives superior results compared with the same amount of conventional water-reducing agents. Thus, completely unexpectedly, for a given ratio $(W/C)$, the amount of calcium aryl- or alkylaryl-sulfonate salt of the present invention may be reduced at least 20% by weight compared with the amount required to yield the same fluidity upon mixing should conventional water-reducing agents be employed in the binder. Furthermore, the improved water-reducing agents of the invention provide enhanced duration of the fluidity of the binder composition, as compared with known agents.

Additionally, the process according to the invention proves particularly valuable for high strength mortars and concretes which require increased quantities of water-reducing agents. In fact, contrary to the conventional water-reducing agents, the products according to the invention do not introduce air, even when added in relatively large amounts; hence, they can be added at the rate of 1 to 10% and preferably of 1 to 2% by weight relative to the cement without impairing the mechanical strength of the concrete or the mortar in which the cement is used.

The agents of the present invention are generally compatible with all types of hydraulic binders, and in particular with the Portland-type of cements, as well as to the mortars and concretes into which they are incorporated. They may be successfully utilized in conventional concretes, including reinforced concrete, road-making concretes, prefabricated concretes, prestressed concretes, quick-setting mortars and cement slurries used for injection. The products according to the invention may be introduced into the cement at the stage at which the latter is ground; they may be dispersed in the cement and the aggregate, used as the base for concrete and mortars, before mixing with water; or they may be introduced in suspension into the mixing water before the latter is used; they may also be introduced into fresh concrete immediately before being introduced into shuttering.

According to an alternate preferred embodiment of the invention, compounds of the formula $(x\ CaO.\ y\ Al_2O_3.\ z_1\ R_1.Z_2\ R_2.\ nH_2O)_m$, in which $R_1$ and $R_2$ represents two different calcium aryl- or alkylaryl-sulfonates, may also be used.

In order to further illustrate the objects and advantages of the present invention, the following examples will be given, it being appreciated that the same are intended to be illustrative and in nowise limitative.

In the following examples, the French standards used are found in the "Catalogue des Normes Francoises" edited by the Association Francoise de Normalisation.

EXAMPLE 1

Preparation of the product $(2.5\ CaO.Al_2O_3\ 3R.\ nH_2O)_4$, in which R is the calcium salt of polymethylenenaphthalene-sulfonate, is carried out in accordance with process (1) above:

3,420 parts of a 20% strength aqueous solution of aluminum polymethylenenaphthalene-sulfonate were poured into 1,000 parts of milk of lime consisting of 200 parts of lime and 800 parts of water under stirring; after stirring for 1 hour, a suspension of very fine particles was obtained.

The extract was dried for 3 hours at 105° C. to yield a product having an aluminum content of 3.6% and a calcium content of 13.8%, and exhibiting a degree of hydration corresponding to a value of 6 for $n$. The solids content of the filtrate, which corresponds largely to the unreacted sulfonate, was 2.5%. If the extract initially obtained was dried in dry air at 30° C. a hydrate was obtained having a value of about 30 for $n$. This product exhibited a weight about 1.3 times greater than the solid obtained by drying at 105° C. as above.

EXAMPLE 2

Preparation of the product $(3\ CaO.Al_2O_3.3R\ nH_2O)_4$, in which R is the calcium polymethylenephthalenesulfonate salt, is carried out according to the process (1) above:

3,420 parts of a 20% strength aqueous solution of aluminum polymethylenenaphthalenesulfonate were added to 1,110 parts of milk of lime containing 222 parts of lime and 888 parts of water under stirring; stirring was continued for about 1 hour, during which time a suspension settled slowly from the solution.

The suspension was filtered to yield 3.1% solids which were dried for 3 hours at 105° C. The dried product had an aluminum content of 3.7%, a calcium content of 12.5%, and exhibited a degree of hydration corresponding to a value of about 5 for $n$.

EXAMPLE 3

Preparation of the product $(3\ CaO.Al_2O_3.3R.\ nH_2O)_4$ in which R is the calcium polymethylenenaphthalenesulfonate salt, was conducted according to the process (2) above:

27 parts of tricalcium aluminate, as a very finely ground powder, were added very slowly, with vigorous stirring, to 717 parts of a 20% strength solution of calcium polymethylene-naphthalenesulfonate. The mixture was allowed to settle for 24 hours and a sludge was separated, which was dried by spray-drying; 170 parts of a fine powder, having an aluminum content of 3.6% and a calcium content of 15%, where thus obtained.

On treating the powder with hydrochloric acid, a solution was obtained, in which the calcium polymethylenenaphthalene-sulfonate can be determined from its ultraviolet spectrum. This reveals the content of calcium polymethylenenaphthalenesulfonate to be 81 (parts) per 100 (parts) of powder.

EXAMPLE 4

Preparation of the product $(3\ CaO.Al_2O_3.\ 3R.\ nH_2O)_4$, in which R is the calcium polymethylenenaphthalenesulfonate salt, was carried out according to process (3) above:

145 parts of slaked lime and 16 parts of monocalcium aluminate were added sucessively, in this order, to 717 parts of a 20% strength solution of calcium polymethylenenaphthalene-sulfonate. After stirring for 48 hours, the mixture was allowed to stand and a sludge was separated by decanting; this sludge was dried by spray-drying. 160 parts of a fine powder were thus obtained, containing 3.5% aluminum and 14.6% calcium.

The data in the following comparative examples were obtained through tests on mortars having the following composition:

| Sand, NF (French Standard Specification) P 15,403 | 1,350 grams |
|---|---|
| Artificial Portland cement, or equivalent | 450 grams |
| Water | 225 grams |
| (corresponding to a reduced amount of water, unless stated otherwise) | $\frac{W}{C} = 0.5$ |

The mortar was made in accordance with NF (French Standard Specification) 15,403. The product according to the invention was mixed beforehand with the mixing water.

The comparative tests were conducted on a comparison mortar without adjuvant, on a mortar to which various quantities of calcium polymethylenenaphthalenesulfonate (R) was added, and on a mortar to which the same amounts by weight of the product according to the invention, in which R is calcium polymethylenenaphthalenesulfonate, had been added. Two types of samples were produced.

Comparison mortar A: mortar NF P 15,403 with CPA 325 (artificial Portland cement)
Comparison mortar B: mortar NF P 15,403 with CPAL 325 (artifical Portland cement + blast furnace slag).

The comparative tests were as follows:

1. Measurement of the slump of the fresh mortar

The fluidity of the mortar is measured by the slump of the mortar which was pre-molded into a truncated cone having a base diameter of 8 cm, a top diameter 7 of cm and a height of 4 cm. The mortar was placed on a knocking table which is subjected to 15 knocks at the rate of 1 knock per second; the knock being brought about by a drop in height of 15 mm. The slump is expressed in centimeters and corresponds to the mean diameter of the disc-shaped body obtained after the 15 knocks.

2. Measurement of the amount of air introduced

This was measured by a mortar aerometer which measures compressibility and is calibrated in percent by volume.

3. Measurement of the flexural strength and compressive strength

These measurements were carried out in accordance wtih NF (French Standard Specification) P 15,451. The strengths were determined on samples of 4 × 4 × 16 cm having first been maintained for 24 hours in a chamber at 20° C. and 100% relative humidity, and then immersed in a tank filled with water thermostatically controlled at 20° C. until testing.

For flexural strength measurements, the sample was placed on two supports consisting of rollers of 10 mm diameter spaced 106.7 mm apart. A third roller of the same diameter, equidistant from the two others, transmits a load which is caused to increase from 5 da N/s. The flexural strength, corresponding to the breakage of the sample, was expressed in bars.

For the compressive strength, the measurement was conducted on the two pieces of the broken sample resulting from the flexural test. The compression was transmitted by two hard metal plates at least 10 mm thick, 40 mm wide and 40 mm long. The load was increased at a stress rate of 15 bars/s until breakage occurred. The result is expressed in bars.

The figures given in the tables represent the mean of the results on 3 samples which have been broken in the flexural test, and hence of 6 compressive measurements.

TABLE NO. 1

| | COMPARISON MORTAR A | Adjuvant: calcium polymethylene-napthalenesulfonate | | | | | | Adjuvant according to the invention | | | | | |
|---|---|---|---|---|---|---|---|---|---|---|---|---|---|
| Amounts by weight of adjuvant in % relative to the cement | 0 | 0.2 | 0.4 | 0.6 | 0.8 | 1.0 | 2 | 0.2 | 0.4 | 0.6 | 0.8 | 1.0 | 2 |
| W/C | 0.5 | 0.49 | 0.46 | 0.44 | 0.43 | 0.42 | 0.40 | 0.48 | 0.46 | 0.44 | 0.43 | 0.425 | 0.42 |
| AIR INTRODUCED (% by volume) | 2 | 1.5 | 1.5 | 2 | 0.8 | 3 | 30 | 1 | 0.5 | 0.5 | 2 | 1 | 1 |
| FLEXURAL STRENGTH IN BARS | | | | | | | | | | | | | |
| after 1 day | 25 | 25 | 26 | 35 | 32 | 32 | 5 | 25 | 30 | 33 | 37 | 35 | 2 |
| after 3 days | 50 | 49 | 49 | 52 | 52 | 52 | 35 | 53 | 55 | 60 | 63 | 60 | 61 |
| after 7 days | 65 | 65 | 69 | 69 | 66 | 67 | 36 | 70 | 70 | 70 | 74 | 81 | 75 |
| after 28 days | 76 | 78 | 76 | 75 | 80 | 80 | | 85 | 84 | | | | |
| COMPRESSIVE STRENGTH EXPRESSED IN BARS | | | | | | | | | | | | | |
| after 1 day | 100 | 102 | 115 | 134 | 131 | 125 | 19 | 106 | 118 | 138 | 155 | 140 | 25 |
| after 3 days | 250 | 250 | 260 | 300 | 288 | 300 | 165 | 275 | 304 | 325 | 375 | 394 | 369 |
| after 7 days | 360 | 394 | 440 | 447 | 481 | 475 | 206 | 406 | 450 | 506 | 536 | 544 | 444 |
| after 28 days | 520 | 561 | 616 | 669 | 688 | 350 | 582 | 618 | 648 | 690 | 805 | 530 | |
| SLUMP OF THE MORTAR | | | | | | | | | | | | | |
| 10 minutes after mixing | 14.5 | 14.6 | 14.5 | 14.4 | 14.5 | 14.5 | | 14.5 | 14.5 | 14.5 | 14.6 | 14.4 | 14.5 |
| 30 minutes after mixing | 13.5 | 13.6 | 13.7 | 14.0 | 14.0 | 14.1 | | 14.3 | 14.4 | 14.3 | 14.2 | 14.2 | 14.4 |
| 1 hour after mixing | 12.1 | 12.3 | 12.5 | 13.5 | 13.7 | 13.6 | | 14.5 | 14.5 | 14.5 | 14.6 | 14.5 | 14.5 |
| 2 hours after mix9ing | 11.2 | 11.0 | 11.2 | 12.2 | 13.1 | 13.2 | | 14.4 | 14.5 | 14.4 | 14.6 | 14.5 | 14.5 |

TABLE NO. 2

| | COMPARISON MORTAR B | Adjuvant: calcium polymethylene-naphthalenesulfonate | | | | | | Adjuvant according to the invention | | | | | |
|---|---|---|---|---|---|---|---|---|---|---|---|---|---|
| Amounts by weight of adjuvant in % relative to the cement | 0 | 0.2 | 0.4 | 0.6 | 0.8 | 1.0 | 1.2 | 0.2 | 0.4 | 0.6 | 0.8 | 1.0 | |
| W/C | 0.5 | 0.475 | 0.44 | 0.43 | 0.42 | 0.39 | 0.385 | 0.48 | 0.46 | 0.44 | 0.43 | 0.42 | 0.415 |
| AIR INTRODUCED (% by volume) | 2 | 2 | 1.5 | 12 | 5 | 10 | 16 | 1 | 0.5 | 0.5 | 0.5 | 0.5 | 0.5 |
| FLEXURAL STRENGTH EXPRESSED IN BARS | | | | | | | | | | | | | |
| after 1 day | 18 | 18 | 24 | 23 | 21 | 21 | 13 | 23 | 25 | 30 | 32 | 32 | 28 |
| after 3 days | 33 | 36 | 47 | 46 | 47 | 40 | 37 | 48 | 56 | 51 | 60 | 61 | 65 |
| after 7 days | 49 | 51 | 62 | 63 | 56 | 65 | 49 | 62 | 66 | 71 | 74 | 76 | 80 |

TABLE NO. 2-continued

| | COMPARISON MORTAR B | Adjuvant: calcium polymethylene-naphthalenesulfonate | | | | | | Adjuvant according to the invention | | | | | |
|---|---|---|---|---|---|---|---|---|---|---|---|---|---|
| after 28 days | 66 | 65 | 74 | 71 | 57 | 65 | 64 | 70 | 78 | 80 | 82 | 82 | 82 |
| COMPRESSIVE STRENGTH EXPRESSED IN BARS | | | | | | | | | | | | | |
| after 1 day | 81 | 82 | 105 | 108 | 88 | 76 | 42 | 100 | 113 | 130 | 144 | 155 | 127 |
| after 3 days | 247 | 250 | 310 | 291 | 288 | 219 | 256 | 324 | 344 | 397 | 406 | 447 | |
| after 7 days | 306 | 306 | 380 | 394 | 372 | 403 | 256 | 356 | 425 | 507 | 544 | 585 | 616 |
| after 28 days | 460 | 500 | 519 | 535 | 413 | 428 | 435 | 550 | 595 | 625 | 675 | 710 | 740 |
| SLUMP OF THE MORTAR EXPRESSED IN CM | | | | | | | | | | | | | |
| 10 minutes after mixing | 15.2 | 15.2 | 15.3 | 15.1 | 15.1 | 15.2 | 15.2 | 15.2 | 15.1 | 15.2 | 15.2 | 15.1 | 15.2 |
| 30 minutes after mixing | 13.3 | 13.1 | 13.8 | 14.3 | 14.4 | 14.6 | 14.4 | 14.7 | 15.0 | 14.9 | 14.8 | 15.0 | 15.3 |
| 1 hour after mixing | 13.5 | 13.1 | 13.1 | 13.5 | 13.7 | 13.5 | 13.6 | 15.3 | 15.1 | 15.2 | 15.4 | 15.1 | 16.1 |
| 2 hours after mixing | 12.1 | 11.9 | 11.7 | 11.9 | 12.0 | 11.9 | 12.2 | 15.2 | 15.0 | 15.3 | 15.6 | 15.8 | 15.8 |

While the invention has now been described in terms of various preferred embodiments and compositions, and has been illustrated by numerous examples and comparative data, the skilled artisan will appreciate that various substitutions, omissions, changes, and modifications may be made without departing from the spirit thereof. Accordingly, it is intended that the invention be limited solely by the scope of the following claims.

What is claimed is:

1. A water-insoluble alumino-calcium composition for reducing the amount of mixing water for a hydraulic binder when incorporated therewith, while increasing the workability and physical properties of said binder, which composition comprises a member of the general formula $$(x\,CaO.y\,Al_2O_3.zR\,nH_2O)_m,$$

where
$x = 2$ to 3;
$y = 0.5$ to 1.5;
$z = 0.5$ to 3.5;
$n = 0$ to 50;
$m = 1$ to 50; and, R is selected from the group comprising calcium aryl sulfonate salts and calcium alkylaryl sulfonate salts.

2. The composition as defined in claim 1, condensed with formaldehyde.

3. The composition as defined by claim 2, wherein R is a calcium salt of the sulfonation products of fused polycyclic hydrocarbons containing 2 to 12 fused benzene rings.

4. The composition as defined in claim 2, wherein R is a calcium salt of the products obtained by condensing formaldehyde with the compounds from the sulfonation of monocyclic or fused polycyclic hydrocarbons containing 1 to 12 benzene rings.

5. The composition as defined in claim 4, wherein R is the calcium salt of polymethylene napthalene sulfonate.

6. A hydraulic binder having from about 0.15 to about 10%, by weight, of the composition as defined in claim 1 incorporated therein.

7. The hydraulic binder of claim 6, wherein said composition is present in an amount of from about 0.1% to about 2%.

8. A structural member formed from a cement having the binder as defined by claim 7.

* * * * *